United States Patent
Walter, Jr. et al.

(10) Patent No.: US 6,197,363 B1
(45) Date of Patent: Mar. 6, 2001

(54) METHODS FOR PRODUCING COOKED SWEETPOTATO PRODUCTS AND COMPOSITIONS THEREOF

(75) Inventors: William M. Walter, Jr.; Van Den Truong, both of Raleigh, NC (US); Ruth Karina Espinel, Duncan, SC (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/216,518

(22) Filed: Dec. 18, 1998

(51) Int. Cl.$^7$ ........................................ A23L 1/217
(52) U.S. Cl. ........................ 426/637; 426/89; 426/273; 426/438
(58) Field of Search .................................. 426/637, 524, 426/438, 273, 297, 311, 302, 549, 573, 89

(56) References Cited

U.S. PATENT DOCUMENTS

| | | | |
|---|---|---|---|
| 4,663,180 | 5/1987 | Padula | 426/637.512 |
| 5,480,672 | * 1/1996 | Kusano et al. | 426/615 |
| 5,552,166 | * 9/1996 | Harada et al. | 426/89 |

OTHER PUBLICATIONS

Food Science—Walter WM—Compositional & Bio-Chemical Factors Controlling the Texture of Sweet Potatoes, Sep. 30, 1996.*

Truong, V.D. and Walter, W.M., Jr., (1994) "Physical and Sensory Properties of Sweetpotato Puree Texturized with Cellulose Derivatives", *Journal of Food Science*, 59(6):1175–1180.

Truong, V.D., Walter, W.M., Jr., and Giesbrecht, F.G., (1995), "Texturization of Sweetpotato Puree With Alginate: Effects of Tetrasodium Pyrophosphate and Calcium Sulfate", *Journal of Food Science*, 60(5):1054–1059.

Walter, W.M., Jr., (1997)"Restructuring of Purees Made from Beauregard and Hernandez Cultivar Sweetpotatoes" Progress Report to N.C. Sweetpotato Commission, Inc., Presented Dec. 28, 1997.

* cited by examiner

*Primary Examiner*—Gabrielle Brouillette
*Assistant Examiner*—Hao Mai
(74) *Attorney, Agent, or Firm*—M. Howard Silverstein; John D. Fado; G. Byron Stover

(57) ABSTRACT

Methods for producing cooked sweetpotato products suitable for freezing, baking or frying comprising adding to a cooked sweetpotato purée additional edible dry matter, tetrasodium pyrophosphate, a gelling agent and a calcium salt-water suspension sufficient to cause gelling, mixing the aforementioned ingredients together and forming the resulting mixture into desired shapes are disclosed. Structured sweetpotato food products comprising sweetpotato purée, added edible dry matter, tetrasodium pyrophosphate, alginate, added sucrose, added calcium and added water which can be frozen, baked or fried are also disclosed.

3 Claims, No Drawings

METHODS FOR PRODUCING COOKED SWEETPOTATO PRODUCTS AND COMPOSITIONS THEREOF

FIELD OF THE INVENTION

The present invention relates to a method for producing cooked sweetpotato products suitable for freezing, baking or frying. These convenience sweetpotato products have good flavor and textural properties, and can have lower fat when compared to commercial fried products from Irish potato.

BACKGROUND OF THE INVENTION

The sweetpotato (*Ipomaea batata*) is an economical and healthful food crop that contains high beta-carotene and substantial amounts of ascorbic acid and minerals. Yet, only a limited amount of sweetpotato production is utilized for processing into canned roots, canned puree, patties, and baby foods. At present, the main market form of sweetpotatoes is fresh roots for home cooking, which usually required considerable preparation time. Moreover, the quality of cooked sweetpotatoes can vary due to varietal differences, growing conditions, and postharvest handling practices. These facts pose a serious problems to the sweetpotato industry, which has been declining.

In order to fully exploit the potential of sweetpotatoes, development of new food products that require minimal home preparation and meet the preferences of today's consumers is, therefore, necessary. With the availability of food ingredients possessing various functionalities, convenience products from meat (G. R. Schmidt and W. J. Means, 1986, U.S. Pat. No. 4,603,054), fruits (K. Hannigan in Food Engineering, 1983, 55:48) and Irish potatoes (J. E. Citti and C. S. Dienst, 1980, U.S. Pat. No. 4,198,437) have been developed. M. A. Padula (1987) disclosed a method for producing structured potato french fries, string or has browns using alginate. Products made with alginate, which require the addition of calcium ions to trigger gelling, can often have a bitter taste that limits the products' acceptance by consumers.

Until now, advances in food ingredient technology have not been applied to sweetpotatoes. Sweetpotatoes are well suited for use in more types of structured products than any other high beta-carotene vegetables. It would be particularly desirable to use sweetpotatoes as a substitute for the extremely popular American french fry product made from Idaho potatoes. There is an unmet need for healthful, tasty products made from sweetpotatoes.

SUMMARY OF THE INVENTION

In accordance with the present invention, there are provided methods for producing a cooked sweetpotato product suitable for freezing, baking and frying, comprising: (a) adding to cooked, peeled and puréed sweet potato roots additional edible dry matter to bring the dry matter content to at least approximately 25%, tetrasodium pyrophosphate (TSPP), a gelling agent, and a calcium salt-water suspension sufficient to cause felling; (b) mixing all the ingredients in (a) together; and (c) forming the resulting mixture into desired shapes and allowing them to gel. Also provided are structured sweetpotato food products comprising at least approximately 85% sweetpotato purée, at least approximately 5% added edible dry matter, approximately 0.2% TSPP, 0.3–0.7% alginate, at least approximately 4% added sucrose, 0.3–0.5% added calcium, and approximately 2–5% added water. Such structured sweetpotato products can be frozen, baked or fried.

DETAILED DESCRIPTION OF THE INVENTION

Definitions:

As used herein, the following terms have the meanings set forth below:

"A" or "an" can mean one or more, depending upon the context in which it is used.

"Batter", "coating", and "breading" are used interchangeably herein and refer to an edible material that can be coated onto food products prior to frying.

"Purée", "puréed", and "puréeing" mean sweetpotato roots that have been ground, mashed, chopped, blended, or otherwise treated such that the roots are in a form suitable for mixing with other materials.

Detailed Description:

The present invention is useful for all cultivars of sweetpotato roots and for all sizes of roots. In a preferred embodiment, orange-fleshed sweetpotatoes are utilized. In specific embodiments, the cultivars named Jewel, Beauregard, and Hernandez are utilized. The methods allow the use of mixtures of roots from several sweetpotato cultivars to be processed together into a final product line.

Sweetpotato roots are first peeled according to methods well-known in the art. For example, roots can be "lye-peeled" by immersion in a boiling solution of sodium hydroxide, preferably a solution of 5.5%, for 4 minutes, then thoroughly washed in a rotary reel-sprayed washer to remove the skins and lye residue. Other peeling methods such as steaming and abrasion can also be used.

The sweetpotato roots are processed to allow gelatinization of the starch, through the activity of endogenous amylase enzymes which form maltose from the starch. The processing eventually results in the inactivation of these enzymes. Typically, this is accomplished by cooking. For example, peeled roots are diced or sliced and then steam-cooked for approximately 20 minutes in a thermascrew cooker (for example, a Reitz Thermascrew Cooker by Hosokawa Micron International, Inc., New York, N.Y.). Roots can be cooked whole using other cooking apparati, but the cooking time will be longer.

The cooked sweetpotato roots should be processed to a consistency that is appropriate for mixing in ingredients specified in the methods of this invention. Such processing can be accomplished, for example, by chopping, blending, or mashing, resulting in a "purée" of sweetpotato roots that can be used in the methods of this invention. A typical method for creating a "purée" is to use a hammer mill (for example, a Fitzmill Model D Comminuting Machine; Fitzpatrick & Co., Chicago, Ill.) fitted with a 0.15 cm screen, through which is pushed the cooked and peeled roots.

After processing sweetpotato roots into a purée, the dry matter content of the purée is adjusted to be at least approximately 25%, as calculated on a fresh weight basis. In a preferred embodiment, the dry matter content is adjusted to a value between 25% and 40%. The dry matter content is adjusted by adding one or more edible materials selected from the group consisting of: potato flakes, sweet potato flakes, wheat flour and starch. In a preferred embodiment, the dry matter content is between 25% and 35%. In a specific embodiment, the dry matter content is approximately 27%. Dry matter content is typically determined by taking a sample of the purée, determining its fresh weight, then drying the sample at 100° C. until a consistent, dry weight value is obtained. The dry weight value is typically expressed as a percentage of the wet weight value.

The dry matter content of sweetpotato puree prepared according to methods disclosed herein is typically a value between approximately 16% and 21%. The amount of added edible dry matter needed to obtain at least approximately 25% dry matter in the final product is at least approximately 5%. In preferred embodiments, the amount of added edible dry matter is a value between 5% and 25%, preferably between 5% and 9%. In a specific embodiment the amount of added edible dry matter is approximately 7%.

Thus, a method for making a cooked sweetpotato product that is suitable for freezing, baking or frying is provided, comprising the steps of: (a) adding to cooked, peeled and purée sweetpotato roots additional edible dry matter to bring the dry matter content to at least approximately 25%, tetrasodium pyrophosphate (TSPP), a gelling agent, and a calcium-water suspension sufficient to cause gelation; (b) mixing the ingredients in (a) together; and (c) forming the resulting mixture into desired shapes and allowing them to gel completely. In a preferred embodiment, sugar is added in step (a). In a specific embodiment, the TSPP is added to the dry matter-adjuster purée with approximately half of the required sugar, and the purée, TSPP and sugar are mixed together before adding the remaining sugar and other ingredients. Mixing of the ingredients is typically accomplished by the use of a motorized device that can blend, chop or otherwise process the ingredients, such that they are evenly distributed in the final mixture, for example, a blender or food processor. The mixing can be done continuously as ingredients are added, or it can be done in intervals, following the addition of each one or a combination of ingredients.

The sugar is added to improve the flavor and acceptability of the product, as measured by a taste panel described herein. Typical sugars that can be used include sucrose, glucose, fructose, and maltose. Artificial sweeteners that are heat-stable can also be used. The amount of the sugar to be used can be determined by preparing samples with a range of sugars and submitting the samples to a taste panel. In one embodiment, sucrose is used, since it is an inexpensive ingredient. In preferred embodiments, the amount of sucrose added is between 4% and 6%, on a weight basis. It is well known in the art that other sugars can be substituted for sucrose, based on measurements of relative sweetness of the various sugars. For example, on a scale of relative sweetness in which sucrose is given a value of 1, glucose has a value of 0.74, fructose has a value of 1.73, and maltose has a value of 0.33 (see for example Biester, A., M W Wood, and C S Whalin (1925), Amer. J. Physiol. 73:387–396). Thus, one skilled in the art could substitute appropriate amounts of any sugar for sucrose, using these known measures of relative sweetness. Many artificial sweeteners have relative sweetness values that may be hundred-fold or more higher than sucrose. In formulations where a more intense sugar or artificial sweetener is used in place of sucrose, additional dry matter, as described herein, is included so that the total of the percentages of added sugar, added dry matter, and purée is between 90 and 97%.

The gelling agent can be selected from the group consisting of: alginate, methylcellulose and hydroxypropylmethyl cellulose. Any one or more of these gelling agents can be used in combinations with the other agents. In a preferred embodiment, an alginate is used as the gelling agent. An alginate is a monovalent salt of alginic acid, which is composed mainly of mannuronic acid and guluronic acid polymers, and is typically extracted from brown alga plants or cells. Alginates are widely used in the food industry as stabilizers and emulsifiers. Alginates are preferred because they can be used in relatively small amounts, provide a gel of high sensory quality, and are stable over a wide range of temperatures.

One step of the method of this invention comprises forming the mixture into desired shapes, and allowing the shapes to gel. In one embodiment, the mixture is allowed to gel at room temperature. In another embodiment, the mixture is allowed to gel at "refrigeration temperature", typically a temperature between 4–5° C. The time required for gelling is a function of the temperature at which gelling is allowed to occur; the product will complete gelation quicker at room temperature than at refrigeration temperature. Refrigeration during gelation can minimize the growth of micro-organisms that might be present in the mixture. The mixture can be formed into desired shapes, for example by extrusion into edible food casings, such as sausage casings, or by pouring into preformed molds. In a specific embodiment, the mixture is spread or injected into a rectangular mold. After gelation is completed, the rectangular-shaped sweetpotato product can be cut into strips, such as the familiar shape of Idaho potato french fries.

The completely gelled sweetpotato product can be cut into bite sized pieces, for example strips, cylinders, wafers, patties, silvers, or cubes, and then frozen and packaged for distribution or storage.

After the sweetpotato roots are peeled, all of the subsequent steps of the methods of this invention, as described therein, can be performed in continuous lines or in batches. Equipment for both types of processing are known in the art and are easily adapted to practice the methods of this invention.

Also provided is a structured sweetpotato food product comprising at least approximately 85% sweetpotato purée, at least approximately 5% added edible dry matter, 0.15–0.2% TSPP, 0.3–0.7% alginate, at least approximately 4% added sucrose, 0.3–0.5% added calcium, and 2–5% added water. By "added" is meant that the indicated percentage of the ingredient is added during the preparation of the food product. The sweetpotato may already contain some amount of these ingredients naturally, but these naturally occurring amount are not included in the above percentages. In a preferred embodiment, the structured sweetpotato food product contains approximately 85% sweetpotato purée, and approximately 5–9% edible dry matter, selected from the group consisting of potato flakes, sweetpotato flakes, starch, and wheat flour. In a specific embodiment, approximately 7% edible dry matter is added.

The structured sweetpotato food product of this invention can be frozen, typically at a temperature of $^-10°$ C. or below. For long term storage of the product, a storage temperature of at least approximately $^-18°$ C. is preferred.

The structured sweetpotato food product of this invention can be "par-fried", i.e., fried in a cooking oil at a temperature between 140° C. and 180° C., preferably from about 150° C. to 170° C., for a period of time that results in acceptable frying of the pieces without burning, typically between 1 and 3 minutes. Any cooking oil suitable for frying food products in the temperature range can be used, including but not limited to oils from soybean, safflower, peanut, canola, rice, and corn. After frying, the sweetpotato pieces are drained of excess oil, and then frozen, typically at a temperature of $^-10°$ C. or below. Such a product typically has a fat content of less than 10% and a beta-carotene content of at least 6 mg/100 g product. This product can be sold and distributed for final heating, such as deep-fat frying or oven baking, by the purchaser.

In a specific embodiment, the frozen structured sweetpotato product, prior to par-frying can be coated with a breading batter (e.g. from Kelco, a division of Nutrasweet Company; San Diego, Calif.), drained for a few seconds of excess batter, then par-fried in a cooking oil at a temperature between 140° and 180° C. for 1–3 minutes, and finally frozen, typically at a temperature of −10° C. or below. The breading batter enhances the crispness of the sweetpotato product.

Any of these frozen sweetpotato food products, i.e. the gelled frozen products, the gelled, frozen and par-fried product, or the gelled, frozen, coated, and par-fried product, can be packaged in a variety of convenient sizes for distribution to retail consumer markets, such as supermarkets, or wholesale distributors, who service restaurants and food service operations.

The present invention is demonstrated by the following examples which are intended only to further illustrate the invention and not to limit the scope of the invention as defined by the claims.

EXAMPLE 1

Production and Analysis of Structured Sweet Potato Fried Product

A. Production

Sweetpotato roots (Jewel cultivar) were washed, lye-peeled and made into a purée. The purée was mixed with other ingredients in the preparation of several samples of restructured sweetpotato fries. The ingredient composition of the product formulations are shown in Table 1. The indicated amounts of each ingredients were used in the procedure described below, to produce nine samples of restructured sweetpotato fries.

Procedure:

1. The indicated amount of sucrose is divided into two parts, and one part is pre-mixed with the TSPP and the other part is pre-mixed with the alginate.

2. A calcium-water suspension is prepared by mixing together the indicated amount of calcium sulfate and water.

3. The indicated amount of sweetpotato purée is placed in an electronic chopper (Model UMC5, Stephan Co., West Germany). Potato flakes and the TSPP-sucrose pre-mix are added, and thee ingredients are thoroughly blend at 1800 rpm for 30 seconds. The side of the chopper are scraped to release material adhering to the sides of the bowl, and the ingredients are blended for another 30 seconds.

4. The alginate-sucrose pre-mix is added to the mixture, and the mixture is again blended as in step 3.

5. The calcium sulfate suspension is added to the resulting mixture from step 4, and the mixture is again blended as in step 3.

6. The mixture is immediately extruded into casings and gelation occurs for several hours at 4° C.

7. The gels are cut into 0.9×0.9×9 cm strips, frozen and stored.

8. The frozen strips are fried in cooking oil at 160° C. for 3 minutes.

TABLE 1

Ingredient concentrations (percent of total formulation) of restructured sweetpotato fries.

| Formulation Number | Sweet potato Purée (%) | Sucrose (%) | Potato Flakes (%) | TSPP (%) | Alginate (%) | CaSO$_4$ (%) | Water (%) |
|---|---|---|---|---|---|---|---|
| 1 | 85.85 | 4 | 7 | 0.18 | 0.60 | 0.375 | 2 |
| 2 | 85.60 | 4 | 7 | 0.18 | 0.60 | 0.625 | 2 |
| 3 | 85.35 | 4 | 7 | 0.18 | 1.10 | 0.375 | 2 |
| 4 | 85.10 | 4 | 7 | 0.18 | 1.10 | 0.625 | 2 |
| 5 | 84.97 | 4 | 7 | 0.18 | 1.35 | 0.500 | 2 |
| 6 | 85.97 | 4 | 7 | 0.18 | 0.35 | 0.500 | 2 |
| 7 | 85.22 | 4 | 7 | 0.18 | 0.85 | 0.750 | 2 |
| 8 | 85.62 | 4 | 7 | 0.18 | 0.95 | 0.250 | 2 |
| 9 | 85.47 | 4 | 7 | 0.18 | 0.85 | 0.500 | 2 |

B. Analysis

1. Textural Analysis

The textural properties of fried strips prepared by the procedure described in 1.A. were determined using an Instron Universal Testing Machine (Model 1122, Instron Inc., Canton, Mass.) following the Texture Profile Analysis method (M. C. Bourne, 1978, Food Technology 32:62). Table 2 demonstrates that restructured sweetpotato fries with different textural properties can be obtained using various concentrations of alginate and calcium sulfate. All the formulated structured sweetpotato fries scored higher than fries made from fresh sweetpotato roots. Fresh roots were prepared by cutting whole, cooked sweetpotato roots into strips, blanching for 2 minutes at 100° C., freezing and frying as described.

TABLE 2

Textural properties and acceptability scores of the sweetpotato fries. Instrumental Texture Profiles

| Formulation | Hardness (N) | Instrumental Cohesiveness | Textile Profiles Springiness | Gumminess (N) | Chewiness (N) |
|---|---|---|---|---|---|
| 1 | 6.22 | 0.23 | 0.24 | 1.42 | 0.32 |
| 2 | 11.41 | 0.20 | 0.23 | 2.35 | 0.54 |
| 3 | 14.64 | 0.25 | 0.28 | 3.69 | 1.01 |
| 4 | 20.82 | 0.22 | 0.28 | 4.63 | 1.24 |
| 5 | 18.56 | 0.22 | 0.31 | 4.06 | 1.24 |
| 6 | 7.85 | 0.24 | 0.21 | 1.92 | 0.39 |
| 7 | 22.67 | 0.21 | 0.27 | 4.78 | 1.25 |
| 8 | 3.27 | 0.30 | 0.21 | 0.96 | 0.18 |
| 9 | 15.46 | 0.22 | 0.30 | 3.43 | 0.99 |
| Fresh Roots | 7.17 | 0.15 | 0.23 | 1.10 | 0.17 |

2. Consumer Taste Panel

A taste panel composed on untrained volunteers were asked to taste the various sweetpotato fries prepared by the method described in A. The samples were presented in random order, and the panelists were asked to complete a ballot evaluating the fries in four categories: Color, Texture, Flavor, and Overall on a scale from 1–9, as defined below:

9=like extremely
8=like very much
7=like moderately
6=like slightly
5=neither like nor dislike
4=dislike slightly
3=dislike moderately
2=dislike very much
1=dislike extremely Taste panelists are reluctant to score any product at either extreme, so the scale is effectively from 2–8. The results are presented in Table 3. Panelists found the structured sweetpotato fries acceptable in all four categories, while the product made from fresh roots was not liked by the panelists.

TABLE 3

Sensory Attributes

| Formulation | Appearance | Texture | Taste | Overall |
|---|---|---|---|---|
| 1 | 7.0 | 6.1 | 6.4 | 6.2 |
| 2 | 7.2 | 6.2 | 6.2 | 6.3 |
| 3 | 7.1 | 6.2 | 6.5 | 6.2 |
| 4 | 7.1 | 6.0 | 5.8 | 5.8 |
| 5 | 6.6 | 5.7 | 5.9 | 5.7 |
| 6 | 7.0 | 7.0 | 7.1 | 7.0 |
| 7 | 7.2 | 6.2 | 5.9 | 6.1 |
| 8 | 6.5 | 6.0 | 6.5 | 6.1 |
| 9 | 6.9 | 6.1 | 6.1 | 6.1 |
| Fresh roots | 4.9 | 4.9 | 5.4 | 4.8 |

EXAMPLE 2

Structured Sweetpotato Fries made with Sweetpotato Flakes

Samples of structured sweetpotato fries were prepared following the procedure described in Example 1, using the ingredient formulations 3 and 9 (Table 1) substituting sweetpotato flakes for potato flakes. These samples had the same acceptability scores as those containing potato flakes when scored by a consumer taste panel.

EXAMPLE 3

Oil Uptake by Structured Sweetpotato Fries

Samples of structured sweetpotato fries were prepared using formulation no. 6 in Table 1 and the procedure in Example 1. The frozen strips were fried in cooking oil at 160° C. for 0.5, 1, 2 and 3 minutes. Samples were analyzed for fat content following the official method of the Association of Official Analytical Chemists (1990; "Chloroform-methanol extraction for fats in foods", Paper No. 983.23).

Table 4 shows that the oil uptake by the sweetpotato product leveled off at about 10% (wet weight basis) after 2 minutes of frying. Under these conditions, the product had a crispy crust and good inside texture.

TABLE 4

Oil Uptake By Structured Sweetpotato Fries

| Frying Time (Minutes) | Oil Content (%) |
|---|---|
| 0 | 0.4 |
| 0.5 | 6.0 |
| 1.0 | 8.1 |
| 2.0 | 10.0 |
| 3.0 | 10.0 |

EXAMPLE 4

Fat content and Color Retention in Structured Sweetpotato Fries

Structured sweetpotato fries and sweetpotato fries made from fresh roots, were prepared according to the procedure in Example 1 using the 9 formulations in Table 1. The products were analyzed for fat content as mentioned above. The color values (L*, a*, b*) were determined from reflectance measurements using a Spectrogard color system (Pacific Scientific, Silver Spring, Md.) with daylight illumination.

Table 5 demonstrates that the structured sweetpotato fries had very low fat content. The concentrations of alginate and calcium sulfate in the formulations of restructured sweetpotatoes can be manipulated to obtain the desired levels of fat absorption in the fried products. For comparison, the fat contents in commercial french fries of potato (Formulations A and B in Table 3) are 2–3 times higher (17–23%).

The restructured sweetpotato fries had a dark orange color. Their L*, a* and b* values in Table 5 were similar to those of the samples from fresh roots indicating that the products contain a large amount of beta-carotene. J. Q. Wu, S. J. Schwartz and D. E. Carroll in Journal of Food Science, 1991, 56:710, reported the beta-carotene content as high as 6.26–7.99 mg/100 g in the purée of Jewel sweetpotato, the cultivar used in this Example. Consumption of 100 g of fried Jewel sweetpotato products would meet the Recommended Daily Allowances for beta-carotene, which is 6 mg for adult males (National Research Council, 1989).

TABLE 5

Fat contents and color values of sweetpotato and potato french fries.

| Formulation | Fat (% Net Weight) | Color L* | Color a* | Color b* |
|---|---|---|---|---|
| 1 | 5.67 | 47.85 | 20.52 | 43.4 |
| 2 | 6.32 | 46 | 21.77 | 41.8 |
| 3 | 6.00 | 49.11 | 20.09 | 45.3 |
| 4 | 5.51 | 46.94 | 21.11 | 44.7 |
| 5 | 6.85 | 47.95 | 20.71 | 43.6 |
| 6 | 7.11 | 44.43 | 19.99 | 42 |
| 7 | 9.95 | 48.78 | 21.56 | 48.5 |
| 8 | 11.96 | 46.81 | 18.9 | 41.4 |
| 9 | 7.11 | 42.11 | 21.27 | 39.1 |
| Fresh Roots | 8.39 | 44.78 | 21.04 | 43.3 |
| Commercial Potato French Fries | | | | |
| A | 17.34 | nd | nd | nd |
| B | 22.34 | nd | nd | nd |

EXAMPLE 5

Composition of Purées from Sweetpotato cultivars

Sweetpotato roots from each cultivar are lye-peeled, sliced, and then cooked for 20 minutes in steam at 100° C. The cooked roots are pureed in a hammer mill to a particle size of approximately 0.03 inch. The following compositions were determined:

| | % Total weight in Sweetpotato Purée of Cultivar: | | |
|---|---|---|---|
| Component in Puree | Jewel | Beauregard | Hernandez |
| Water | 79.43 | 83.75 | 81.09 |
| Dry Matter | 20.57 | 16.25 | 18.91 |
| Sugars | 11.87 | 11.64 | 10.45 |
| Starch and Fiber | 8.70 | 7.23 | 8.03 |

EXAMPLE 6

Preparation and Evaluation of Coated Structured Sweetpotato Fries

The purées from Example 6 were processed into a coated, fried product according to the procedure described below.

The amounts of each ingredient used for each cultivar are provided in Table 6.

TABLE 6

Ingredient Amounts for Restructured Sweetpotato Fries from Jewel, Beauregard and Hernandez Cultivars.

| Ingredient | Jewel and Hernandez Amount (g) | % | Beauregard Amount (g) | % |
|---|---|---|---|---|
| Puree | 1719.4 | 85.97 | 1716.4 | 85.82 |
| Potato Flakes | 140 | 7.0 | 140 | 7.0 |
| TSPP* | 3.6 | 0.18 | 3.6 | 0.18 |
| Alginate | 7.0 | 0.35 | 10.0 | 0.5 |
| Sucrose | 80.0 | 4.0 | 80.0 | 4.0 |
| CaSO$_4$** | 10.0 | 0.5 | 10.0 | 0.5 |
| Water | 40.0 | 2.0 | 40.0 | 2.0 |
| Total | 2000.0 | 100 | 2000.0 | 100 |

*TSPP = tetrasodium pyrophosphate
**CaSO$_4$ = calcium sulfate

The sweetpotato puree was mixed with the TSPP, the potato flakes, and one-half of the sucrose for approximately 30 seconds at 1800 rpm in an electronic chopper, creating the first-stage mixed purée. The alginate and remaining sucrose were added to the first-stage mixed purée and then blended for another 30 seconds in the electronic chopper, resulting in the second stage mixed purée. A calcium sulfate suspension, made by mixing the calcium sulfate and water together, was blended into the second stage mixed purée for 30 seconds in the electronic chopper. The resulting mixture was immediately extruded into food casings or molds and allowed to gel at 40° F. until gelation was complete. The gelled product was cut into strips and frozen.

The frozen strips were coated with a clear batter (Kerry Ingredients, Beloit, Wis.), which enhanced retention of the attractive orange sweetpotato color and provided an appealing crisp crust. The coated strips were drained for a few seconds to remove excess batter, and then these were placed in hot cooking oil at 350° F. for 1–2 minutes. The crispness of the crust was measured using a texture analyzer (TA-XT2, Texture Technologies, Inc., Scarsdale, N.Y.), and the values obtained (given as the force (N) to penetrate the crust) were 0.59, 0.62, and 0.7, which were not significantly different between the cultivars.

The structured, coated sweetpotato fries were evaluated by a taste panel. The panel was asked to rate color, crust crispness, inner texture, and flavor and to give an overall rating of the product, using the scale described in Example 1.B.2. The results of the taste panel are presented in Table 7. The results show that these products were well-liked by the panelists, and there was no preference for any one of the three tested sweetpotato cultivars, which represent the major cultivars grown in the United States.

TABLE 7

Sensory Scores for Restructured, Fried Sweetpotatoes from Jewel, Beauregard, and Hernandez Cultivars.

| Sensory Parameter | Jewel | Beauregard | Hernandez |
|---|---|---|---|
| Color | 7.4 | 7.3 | 7.4 |
| Crust Crispness | 7.0 | 6.9 | 7.3 |
| Inner Texture | 7.1 | 7.1 | 7.2 |
| Flavor | 7.0 | 6.8 | 7.1 |
| Overall | 7.0 | 7.0 | 7.3 |

Although the present methods have been described with reference to specific details of certain embodiments thereof, it is not intended that such details should be regarded as limitations upon the scope of the invention except as and to the extent that they are included in the accompanying claims.

Throughout this application, various publications are referenced. The disclosures of these publications in their entireties are hereby incorporated by reference into this application in order to more fully describe the state of the art to which this invention pertains.

What is claimed:

1. A fried sweetpotato product comprising a structured sweetpotato food product which has been cooked in a vegetable oil and which has a fat content less than 10% and a beta-carotene content of at least 6 mg/100 g fried product, wherein said structured sweetpotato product comprises at least approximately 85% sweetpotato purée, 5–8% added edible dry matter, approximately 0.2% tetrasodium pyrophosphate, 0.3–0.7% alginate, 4–6% added sugar, 0.3–0.5% added calcium, and 2–5% added water.

2. The fried sweetpotato product of claim 1 wherein the fat content is between 5.5 and 10%.

3. The fried sweetpotato product of claim 1 wherein the sweetpotato food product is coated with a batter prior to cooking.

* * * * *

UNITED STATES PATENT AND TRADEMARK OFFICE
CERTIFICATE OF CORRECTION

PATENT NO.    : 6,197,363 B1
DATED         : March 6, 2001
INVENTOR(S)   : William M. Walter Jr., Van Den Truong, Ruth Karina Espinel Page 1 of 1

It is certified that error appears in the above-identified patent and that said Letters Patent is hereby corrected as shown below:

<u>Title page,</u>
Item [73] insert the following: Additional Assignee:  North Carolina State University
                                                      Raleigh, NC 27695

Signed and Sealed this

Twenty-first Day of August, 2001

Attest:

*Nicholas P. Godici*

NICHOLAS P. GODICI
*Acting Director of the United States Patent and Trademark Office*

*Attesting Officer*